United States Patent [19]

Buchner et al.

[11] 4,278,716
[45] Jul. 14, 1981

[54] LIGHT WEIGHT PACKAGE CONTAINER MADE FROM MULTI-LAYER MATERIAL

[75] Inventors: Norbert Buchner, Tamm; Dieter Liede, Möglingen, both of Fed. Rep. of Germany

[73] Assignee: Robert Bosch Verpackungsmaschinen GmbH, Waiblingen, Fed. Rep. of Germany

[21] Appl. No.: 82,205

[22] Filed: Oct. 5, 1979

Related U.S. Application Data

[63] Continuation of Ser. No. 794,482, May 5, 1977, abandoned, which is a continuation of Ser. No. 655,569, Feb. 5, 1976, abandoned, which is a continuation of Ser. No. 457,435, Apr. 3, 1974, abandoned.

[30] Foreign Application Priority Data

Apr. 3, 1973 [DE] Fed. Rep. of Germany ....... 2316513

[51] Int. Cl.³ .................... B65D 1/34; B32B 15/08
[52] U.S. Cl. ..................................... 428/35; 220/450; 220/453; 229/3.5 MF; 426/126; 428/457; 428/458; 428/461; 428/463; 428/480; 428/521; 428/522; 428/523
[58] Field of Search ................ 428/35, 457, 458, 480, 428/460, 461, 463, 910, 476.4, 521, 522, 523; 426/126; 220/450, 453; 229/3.5 MF

[56] References Cited

U.S. PATENT DOCUMENTS

| 2,861,022 | 11/1958 | Lundsager | 428/458 |
|---|---|---|---|
| 3,298,559 | 1/1967 | Lurie | 220/63 |
| 3,343,663 | 9/1967 | Seidler | 426/126 |
| 3,589,975 | 7/1971 | Andrews | 156/244 |
| 3,606,958 | 9/1971 | Coffman | 428/515 |
| 3,674,626 | 7/1972 | Mergy | 428/520 |
| 3,836,425 | 9/1974 | Whiting | 428/463 |
| 4,172,914 | 10/1979 | Festag | 426/126 |
| 4,216,268 | 8/1980 | Stillman | 428/910 |

FOREIGN PATENT DOCUMENTS 2614660 10/1977 Fed. Rep. of Germany ........... 426/126

OTHER PUBLICATIONS

F. Zeppelzauer, "Aluminum-Combination Foils", *New Packaging*, Jun., 1962, pp. 657-661, Germany.

*Primary Examiner*—Ellis P. Robinson
*Attorney, Agent, or Firm*—Edwin E. Greigg

[57] ABSTRACT

A light weight packaging container, similar to a capsule and made by deep-drawing and/or stretching of a multi-layer foil composite, is composed of synthetic material and aluminum. An aluminum layer or foil having a thickness within the range of from one grain to a few grains is provided. At least one layer of synthetic material is fixed to the aluminum layer or foil. The total thickness of the synthetic layer or layers is substantially greater than that of the aluminum layer or foil. In one embodiment, only one layer of synthetic material is provided. In another embodiment, two layers of synthetic material are provided, one being fixed to one major surface of the aluminum layer or foil and the other being fixed to the other major surface of the aluminum layer or foil.

12 Claims, 1 Drawing Figure

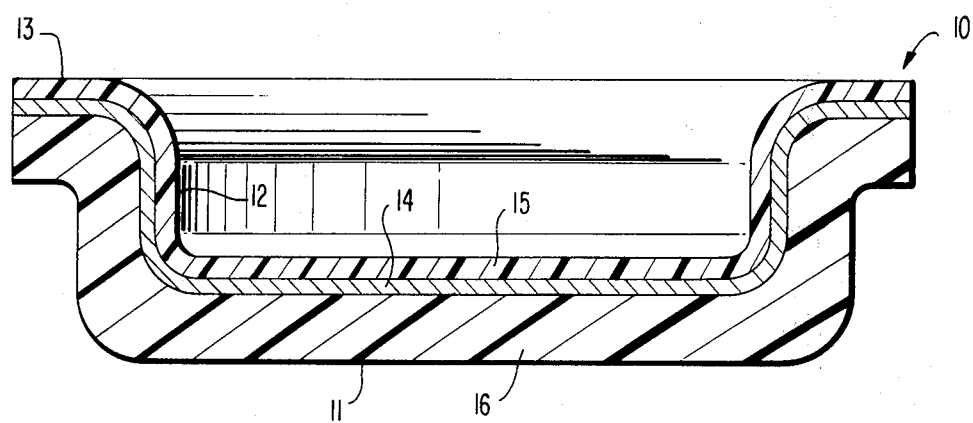

LIGHT WEIGHT PACKAGE CONTAINER MADE FROM MULTI-LAYER MATERIAL

This is a continuation of application Ser. No. 794,482, filed May 5, 1977, now abandoned, which is a continuation of application Ser. No. 655,569, filed Feb. 5, 1976, now abandoned, which is a continuation of Ser. No. 457,435, filed Apr. 3, 1974, now abandoned.

BACKGROUND OF THE INVENTION

This invention relates to a light weight package container made of a multi-layer foil composite. The invention relates, more particularly, to a light weight package container similar to a capsule and manufactured by deep-drawing and/or stretching from a multi-layer foil composite constituted of synthetic material and aluminum.

Within the last ten years, semi-rigid light weight containers for packaging food stuffs have become commercially available. These known light weight containers are deep-drawn from thin aluminum strips having a thickness of from about 0.090 mm. to about 0.150 mm. These containers are closed with a cover which is punched from the same aluminum strip and is fastened on the container by hot sealing. In order to make possible this hot sealing, the insides of the containers and covers are coated with a lacquer capable of hot sealing or with a thermoplastic synthetic material, for example, polypropylene. The thickness of the hot sealing layer, which also prevents a mutual reaction between aluminum and contents, is from about 5 microns to about 10 microns for hot sealing lacquer and from about 30 microns to about 80 microns for coatings made of synthetic material foils.

The aluminum lends rigidity to these known package containers. These package containers are very well suited for the long term storage of perishable food stuffs and ready-to-eat meals, because of the impermeability of the thick aluminum layer. This type of container has been well accepted by the consumer because of its easy handling.

Containers made of thermoplastic synthetic material are also used, particularly for packaging liquid or pasty materials. In most cases, these containers are made from single or multi-layer foils of synthetic material by conventional thermo-forming techniques. Such containers are less expensive than light weight containers made of aluminum, because the raw material is substantially less costly than aluminum. The impermeability of synthetic containers with respect to gases, water vapor and odors, is limited even in multi-layer synthetic foils, because there is no synthetic material whose properties of impermeability are comparable to those of aluminum.

SUMMARY OF THE INVENTION

It is an object of the present invention to provide a light weight packaging container whose properties of impermeability assure long term storage of perishable food stuffs.

It is another object of the present invention to provide a light weight packaging container which has a rigidity equal to or greater than those made of aluminum foil, but whose manufacturing costs are substantially lower than those for light weight containers made of aluminum.

It is an additional object of the present invention to provide a light weight packaging container having a resistance to denting which is better than containers made of aluminum of the same size.

The foregoing objects, as well as others which are to become clear from the text below, are accomplished in accordance with the present invention by providing a light weight composite packaging container made by deep-drawing and/or stretching. The container includes an aluminum layer or foil having a thickness of from one grain to a few grains. At least one layer of synthetic material is fixed to the aluminum layer or foil for providing strength and stability. The total thickness of the at least one layer of synthetic material is substantially greater than that of the aluminum layer or foil.

According to the present invention, its salient feature is that the thickness of the aluminum layer or foil is within the domain of thickness of from one to only several aluminum grains, and the total thickness of the synthetic layer or layers is substantially greater than that of the aluminum layer or foil.

In the light weight containers, according to the invention, it is the synthetic material which gives the container the desired stability; on the other hand, the thin aluminum layer or foil substantially only effects the impermeability of the container. This is based on the fact that an aluminum layer or foil of the thickness of from only one stretched or flattened recrystallization grain of approximately 20 microns still retains extraordinarily high properties of impermeability, sufficient for long term storage of food.

In a particular advantageous embodiment of the invention, the thin aluminum layer or foil is embedded between two synthetic layers, each of whose thickness is greater than that of the aluminum layer.

When a packaging container of this kind is formed, the two outer synthetic layers support the central aluminum layer or foil so that a stretching of the aluminum layer is made possible which could otherwise be achieved only with a substantially thicker aluminum layer or foil. An additional factor is that a container, which has been made from a three-layer synthetic-/aluminum foil composite, has a substantially higher stability and resistance to denting than a container of similar size made of a single aluminum layer or foil.

If one of the outer layers consists of a synthetic material which is bi-axially stretched with an extension possibility before fracture of from about 15 percent to about 50 percent, such as for example, stretched polypropylene, polyamide or polyester, and if this synthetic material is laminated (fixed) to the thin aluminum layer or foil then, thanks to this outer layer, the thin aluminum layer or foil is supported and can achieve an extension before fracture which is so high that a tearing of the aluminum layer or foil is prevented even during rigorous forming and stretching.

The rigidity of such a container is obtained primarily by the second synthetic layer consisting of a relatively inexpensive synthetic material. Preferentially, this second rigidizing outer layer, which has a low tendency to return to its unformed state, such materials are, for example, impact-resistant polystyrene, acrylic butadiene-styrene or polyvinyl chloride. In this way, the full exposure of the aluminum layer or foil to the relaxation forces of the first synthetic layer is prevented, and the manufactured form of the container remains stable.

Light weight containers of this kind and consisting of such a composite, have a particularly favorable resistance with respect to bending stresses when they are handled and transported. Their resiliency is greater than that of known aluminum light weight containers; consequently, their resistance to denting is also more favorable. Due to the fact that the material is primarily synthetic, it is not necessary to roll over the edge of the container so as to prevent injuries due to cuts. This saves material which has a favorable effect on the price of the container. Furthermore, such logically constructed composites of aluminum and synthetic material are less expensive than containers with comparable rigidity made from aluminum strips and provided with synthetic lacquers or coatings.

BRIEF DESCRIPTION OF THE DRAWING

The sole FIGURE is a cross-sectional, diagrammatic view of a container according to an embodiment of the present invention, the thicknesses of the layers being exaggerated for the purpose of clarity and shown somewhat disproportionately.

DETAILED DESCRIPTION OF THE PREFERRED EMBODIMENTS

As shown in the drawing, a light weight packaging container 10 useful for containing tablets or the like and manufactured by deep-drawing, has a bottom 11, a cylindrical wall 12, with a diameter of 40 mm. and a height of 15 mm. The container 10 has an outwardly pointing sealing flange 13 at the upper end of the wall 12. The forming material for the container 10 is a synthetic aluminum composite foil, consisting of an aluminum foil or layer 14 of a thickness of approximately 20 microns, on whose one side there is laminated a bi-axially stretched polypropylene foil or layer 15 of a thickness of substantially 20 microns, and on whose other side there is laminated an acrylic butadiene styrene foil or layer 16 of a thickness of substantially 200 microns. The lamination is effected by means of a suitable adhesive.

The possible elongation before fracture of the aluminum foil or layer 14 of 20 microns thickness is in the range of from about 5 percent to about 6 percent. By lamination with the stretched polypropylene foil or layer 15 of 20 microns thickness, the elongation before fracture of the dual composite is in the range of from about 20 percent to about 30 percent. The other major surface of the foil or layer 14 is equipped with a lamination of an acrylic butadiene styrene foil or layer 16 whose own elongation before fracture is approximately 20 percent. In the region of stresses where the acrylic butadiene styrene foil or layer 16 would be in danger of fracture, it is supported by the polypropylene/aluminum composite, made up of the layers 14 and 15, and instead of rupture, there takes place a reorientation, and during further stretching, the acrylic butadiene styrene foil or layer 16 can, in turn, support the polypropylene aluminum composite made up of the layers 14 and 15, so that the total elongation before fracture of the triple composite can reach 50 percent. This is a property which makes this material composite very useful for forming by deep-drawing.

The forming of such a container, consisting of the foil composite described above, can be achieved by deep-drawing using a conventional stamping or drawing machine tool equipped with a punch, a die, and a hold-down device. A container, made according to this technique, will have substantially the same wall thicknesses and substantially the same layer thicknesses as the starting material. Its stability and impermeability can be called very good.

Furthermore, containers can be made whose walls are additionally stretched after deep-drawing. In spite of the reduction in wall thickness of the layers occurring during such an additional process step, the container still retains sufficient stability and impermeability.

It is also possible to form, especially small, containers out of the above-described foil composite, merely by stretching the flat foil material with the aid of pressurized air, a drawing die or other mechanical means.

While the illustrated embodiment shown in the drawing is a three-layer composite container, it is to be understood that in some instances, containers having only two layers can be provided according to the present invention, one of the layers being the aluminum foil or layer 14, and the other being a layer of synthetic material which is considerably thicker than the layer 14; for example, the layer of synthetic material could be ten times as thick as the foil or layer 14 of aluminum, as is the layer 16 shown in the drawing.

It is to be understood that the foregoing description of preferred embodiments has been given by way of example, not by way of limitation. Numerous variants and other embodiments are possible within the spirit and scope of the present invention, the scope being defined in the appended claims.

What is claimed is:

1. A deep-drawn light weight, semi-rigid, dent-resistant, packaging container, made from a laminated sheet, comprising in combination:
   (a) an aluminum layer having a thickness in the range of from one grain to a few grains; and
   (b) at least one layer of polymeric plastic material, which is biaxially stretched before forming the laminated sheet, to increase the yield strength of the polymeric material, and has an elongation before fracture of 15–50%, said polymeric material being selected from a group consisting of polypropylene, polyamide and polyester, and being laminated to said aluminum layer for providing stretchability, strength and stability, the total thickness of said at least one layer of polymeric material being substantially greater than that of said aluminum layer.

2. A light weight packaging container according to claim 1, wherein said at least one layer of polymeric material comprises a first layer of polymeric material for substantially increasing the stretchability of said aluminum layer and said packaging container further comprises a second layer of synthetic material for substantially lending necessary stiffness to the composite container.

3. A light weight packaging container according to claim 1, wherein said at least one layer of synthetic material is a single layer of synthetic material for lending rigidity to the composite and for increasing the stretchability of said aluminum layer.

4. A light weight packaging container according to claim 2, wherein said aluminum layer is imbedded between said first layer of polymeric material and said second layer of synthetic material wherein the total thickness of said first and second layers is greater than that of said aluminum layer.

5. A light weight packaging container according to claim 4, wherein said first outer layer consists of a synthetic foil which is bi-axially stretched, which has an elongation before fracture of 15–50%, and which is laminated to said aluminum layer, which is in the form of a thin foil.

6. A light weight packaging container according to claim 4, wherein said second outer layer of synthetic material consists of a layer of synthetic material which has a low tendency to return to its state before forming.

7. A light weight packaging container according to claim 1, wherein said aluminum layer is embedded between two layers of synthetic material whose total thickness is greater than that of said aluminum layer and which constitute said at least one layer of synthetic material.

8. A light weight packaging container according to claim 7, wherein said two layers are a first outer layer which consists of a synthetic foil which is bi-axially stretched, which has an elongation before fracture of 15-50%, and which is laminated to said aluminum layer, which is in the form of a thin foil.

9. A light weight packaging container according to claim 8, wherein said second outer layer of synthetic material consists of a layer of synthetic material which has a low tendency to return to its state before forming.

10. A light weight packaging container according to claim 1, wherein said aluminum layer is substantially one grain thick, said thickness of said aluminum layer being substantially 20 microns, the thickness of a flattened recrystallized grain of aluminum.

11. A deep-drawn light weight, semi-rigid, dent-resistant, packaging container, formed from a laminated sheet having a stretch capability of up to 50% elongation without rupture, said laminated sheet comprising:
- a first layer of polymeric plastic material selected from the group consisting of polypropylene, polyamide and polyester, which is biaxially stretched before forming the laminated sheet to increase the yield strength of the polymeric material, and which has an elongation before fracture of 15–50%;
- a second layer of aluminum, which has a thickness in the range of from one grain to a few grains, and which is laminated to said first layer; and
- a third layer of synthetic material which has a low tendency to return to its state before forming, selected from a group consisting of impact-resistant polystyrene, acrylic butadiene styrene, and polyvinyl chloride, which has a thickness substantially greater than said aluminum layer, and which is laminated to said aluminum layer.

12. A container as described in claim 10, wherein the first layer is a polypropylene layer approximately 20 microns thick, said aluminum layer is approximately 20 microns thick, and said third layer is an acrylic butadiene styrene layer approximately 200 microns thick.

* * * * *